US006987358B2

(12) United States Patent
Fujimine et al.

(10) Patent No.: US 6,987,358 B2
(45) Date of Patent: Jan. 17, 2006

(54) GLASS FOR COVERING ELECTRODES, COLORED POWDER FOR COVERING ELECTRODES AND PLASMA DISPLAY DEVICE

(75) Inventors: Satoshi Fujimine, Kanagawa (JP); Tsuneo Manabe, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/618,018

(22) Filed: Jul. 14, 2003

(65) Prior Publication Data

US 2004/0027071 A1    Feb. 12, 2004

(30) Foreign Application Priority Data

Aug. 8, 2002    (JP) ............................. 2002-230995

(51) Int. Cl.
H01J 17/49 (2006.01)
H01J 9/00 (2006.01)
C03C 3/07 (2006.01)
C03C 3/072 (2006.01)

(52) U.S. Cl. ...................... 313/586; 313/582; 313/587; 501/74; 501/75; 445/24

(58) Field of Classification Search ........ 313/542–587; 315/169.4; 345/60; 501/74, 75
See application file for complete search history.

(56) References Cited

U.S. PATENT DOCUMENTS

| 4,824,809 | A | * | 4/1989 | Grabowski et al. ............ 501/75 |
| 5,714,840 | A | | 2/1998 | Tanabe et al. |
| 5,948,537 | A | | 9/1999 | Onoda et al. |
| 5,972,564 | A | * | 10/1999 | Kawana et al. .......... 430/281.1 |
| 6,160,345 | A | | 12/2000 | Tanaka et al. |
| 6,238,847 | B1 | * | 5/2001 | Axtell et al. ................. 430/322 |
| 6,355,586 | B1 | | 3/2002 | Usui et al. |
| 6,376,400 | B1 | | 4/2002 | Fujimine et al. |
| 6,419,540 | B1 | | 7/2002 | Tanaka et al. |
| 6,497,962 | B1 | | 12/2002 | Fujimine et al. |
| 6,555,594 | B1 | * | 4/2003 | Fukushima et al. ........... 522/81 |
| 6,617,789 | B2 | | 9/2003 | Onoda et al. |
| 2001/0024582 | A1 | * | 9/2001 | Hwang ....................... 399/333 |
| 2002/0034917 | A1 | | 3/2002 | Tanaka et al. |
| 2002/0036466 | A1 | | 3/2002 | Tanaka et al. |
| 2002/0096666 | A1 | * | 7/2002 | Ichikawa et al. ........... 252/500 |
| 2004/0202795 | A1 | * | 10/2004 | Sakoske ..................... 427/554 |

FOREIGN PATENT DOCUMENTS

| JP | 11-25865 | 1/1999 |
| JP | 2000-313637 | 11/2000 |
| JP | 2001-139345 | 5/2001 |
| WO | WO 02/102733 | 12/2002 |

OTHER PUBLICATIONS

U.S. Appl. No. 10/618,018, filed Jul. 14, 2003, Fujimine, et al.
U.S. Appl. No. 09/965,278, filed Sep. 26, 2001, Tanaka, et al.
U.S. Appl. No. 09/964,837, filed Sep. 26, 2001, Tanaka, et al.
U.S. Appl. No. 09/247,237, filed Feb. 10, 1999, Fujimine, et al.

* cited by examiner

*Primary Examiner*—Mariceli Santiago
(74) *Attorney, Agent, or Firm*—Oblon, Spivak, McClelland, Maier & Neustadt, P.C.

(57) ABSTRACT

A glass for covering electrodes, which consists, as represented by mass percentage based on the following oxides, essentially of from 35 to 55% of PbO, from 15 to 30% of $B_2O_3$, from 4 to 15% of $SiO_2$, from 20 to 44% of $B_2O_3+SiO_2$, from 0.5 to 10% of $TiO_2+ZrO_2+La_2O_3+Ta_2O_5$, from 0 to 15% of $Al_2O_3$, from 0 to 25% of BaO, from 0 to 1% of CuO and from 0 to 1% of $CeO_2$.

35 Claims, No Drawings

GLASS FOR COVERING ELECTRODES, COLORED POWDER FOR COVERING ELECTRODES AND PLASMA DISPLAY DEVICE

BACKGROUND OF THE INVENTION

1. Field of the Invention

The present invention relates to a low melting point glass suitable for covering for insulation of transparent electrodes made of e.g. ITO (indium oxide doped with tin) or tin oxide, particularly transparent electrodes having a silver electrode formed on a part of their surface, a colored powder and a plasma display device.

2. Discussion of Background

In recent years, a thin flat plate type color display device has attracted an attention. In such a display device, it is necessary to form an electrode for each pixel in order to control the display state in the pixel for forming an image. In order to prevent deterioration of the image quality, transparent electrodes are used as such electrodes. As the transparent electrodes, thin films of ITO or tin oxide formed on a glass substrate, are commonly employed.

Transparent electrodes which are formed on the surface of a glass substrate to be used as a display panel of the above display device, are formed into fine lines to realize fine images. In order to control the respective pixels independently, it is necessary to secure insulation among such finely formed transparent electrodes. However, if moisture is present on the surface of the glass substrate, or if an alkali component is present in the glass substrate, it may happen that an electrical current flows to some extent via the surface of this glass substrate. To prevent such a current, it is effective to form an insulating layer between the transparent electrodes. Further, in order to prevent deterioration of the image quality by the insulating layer formed between the transparent electrodes, such an insulating layer is preferably transparent.

Various materials are known as an insulating material for forming such an insulating layer. Among them, a glass material is widely employed which is a transparent and highly reliable insulating material.

In a plasma display panel (hereinafter referred to as PDP) which is recently expected as a large size flat color display device, cells are defined and formed by a front substrate used as a display surface, a rear substrate and barrier ribs, and an image will be formed by generating plasma discharge in the cells. Transparent electrodes are formed on the surface of the front substrate, and it is essential to cover the transparent electrodes with a glass in order to protect the transparent electrodes from plasma.

Such a glass to be used for covering electrodes, is employed usually in the form of a glass powder. Namely, to such a glass powder, a filler, etc. may be added as the case requires, and then the mixture is formed into a paste. The glass paste thus obtained is coated on a glass substrate having transparent electrodes preliminarily formed, followed by firing to cover the transparent electrodes.

In addition to the electrical insulating property as mentioned above, the glass for covering electrodes is required to have e.g. a softening point of at most 650° C., a linear expansion coefficient of from $60 \times 10^{-7}$ to $100 \times 10^{-7}$/° C. and a high transparency of the electrode-covering glass layer obtained by firing.

As a glass satisfying such requirements, a glass comprising 45% of PbO, 41% of $B_2O_3$, 3% of $SiO_2$ and 11% of MgO, as represented by mass percentage, is, for example, disclosed (JP-A-2000-313637).

The relative dielectric constant at 1 MHz of the disclosed glass is as small as 9.6, and the dielectric constant of the electrode-covering glass layer is small, whereby it is excellent in that the electric power consumption of PDP can be reduced.

However, with PDP, there may be a case where it is required to increase the dielectric constant of the electrode-covering glass layer in view of e.g. a problem relating to an electrical circuit.

SUMMARY OF THE INVENTION

It is an object of the present invention to provide a glass for covering electrodes, a colored powder for covering electrodes, PDP, and a process for producing PDP, to solve such a problem.

The present invention provides a glass for covering electrodes, which consists essentially of, as represented by mass percentage based on the following oxides, from 35 to 55% of PbO, from 15 to 30% of $B_2O_3$, from 4 to 15% of $SiO_2$, from 20 to 44% of $B_2O_3+SiO_2$, from 0.5 to 10% of $TiO_2+ZrO_2+La_2O_3+Ta_2O_5$, from 0 to 15% of $Al_2O_3$, from 0 to 25% of BaO, from 0 to 1% of CuO and from 0 to 1% of $CeO_2$.

Further, the present invention provides a colored powder for covering electrodes, which comprises a powder of such glass for covering electrodes, and a pigment.

Further, the present invention provides a process for producing PDP, wherein covering of transparent electrodes formed on a glass substrate constituting a front substrate, is carried out by coating and firing a powder of the glass for covering electrodes, or the colored powder for covering electrodes, to cover the transparent electrodes.

Still further, the present invention provides PDP comprising a glass substrate constituting a front substrate and transparent electrodes formed on the glass substrate, wherein the transparent electrodes are covered by the above glass for covering electrodes.

DETAILED DESCRIPTION OF THE PREFERRED EMBODIMENTS

The glass for covering electrodes of the present invention (hereinafter referred to simply as the glass of the present invention) is used usually in the form of a powder. For example, a powder of the glass of the present invention is formed into a glass paste by using an organic vehicle, etc. to impart printability, and such a glass paste is coated on electrodes formed on a glass substrate and fired to cover the electrodes. Here, the organic vehicle is one having a binder such as ethyl cellulose dissolved in an organic solvent such as α-terpineol.

In PDP, the glass of the present invention is preferably used for covering transparent electrodes formed on a front substrate.

The softening point $T_s$ of the glass of the present invention is preferably from 450 to 650° C. If it exceeds 650° C., a usual glass substrate having a glass transition point of from 550 to 620° C. is likely to be deformed during firing. $T_s$ is more preferably at most 630° C.

Further, for example, in a case where it is used for an electrode-covering glass layer of a single layer structure, $T_s$ is preferably at least 520° C. or from 520 to 650° C., more preferably at least 550° C., particularly preferably at least 580° C.

As the above glass substrate, it is common to employ one having an average linear expansion coefficient in a range of from 50 to 350° C. (hereinafter referred to simply as an expansion coefficient) within a range of from $80 \times 10^{-7}$ to $90 \times 10^{-7}$/° C. Accordingly, in order to have the expansion characteristics matched with such a glass substrate and to prevent warping or deterioration in strength of the glass substrate, the expansion coefficient α of the glass of the present invention is preferably from $60 \times 10^{-7}$ to $90 \times 10^{-7}$/° C., more preferably from $70 \times 10^{-7}$ to $87 \times 10^{-7}$/° C.

The relative dielectric constant ∈ at 1 MHz at 20° C. of the glass of the present invention is preferably from 10.8 to 13.

In the glass of the present invention, it is preferred that the content of $Al_2O_3$ is from 1 to 10%, and the content of BaO is from 12 to 20%.

Now, the composition of the glass of the present invention will be described as represented by mass percentage.

PbO is a component to lower $T_s$ and is essential. If it is less than 35%, $T_s$ will be high. It is preferably at least 40%. If it exceeds 55%, α will increase. It is preferably at most 50%.

$B_2O_3$ is a component to stabilize the glass and is essential. If it is less than 15%, the glass tends to be unstable. It is preferably at least 18%. If it exceeds 30%, the water resistance will decrease, or a yellow color by colloidal silver will be distinct. Preferably, it is at most 28%. Here, the yellow color by colloidal silver is such a phenomenon that when a silver-containing bus electrode formed on a transparent electrode on a glass substrate constituting a front substrate of PDP, is covered with a glass, silver will diffuse into the glass to color the glass brown, whereby the image quality of PDP will deteriorate.

$SiO_2$ is a component to stabilize the glass and is essential. If it is less than 4%, the glass tends to be unstable. Preferably, it is at least 4.5%. If it exceeds 15%, $T_s$ will be high. Preferably, it is at most 12%. The total content of $B_2O_3$ and $SiO_2$ is from 20 to 44%, preferably from 25 to 40%.

$TiO_2$, $ZrO_2$, $La_2O_3$ and $Ta_2O_5$ are components to increase ∈, and at least one of them is required to be contained. If the total content of $TiO_2$, $ZrO_2$, $La_2O_3$ and $Ta_2O_5$ is less than 0.5%, ∈ tends to be too small. Preferably, the total content is at least 1%. If it exceeds 10%, devitrification is likely to result. Preferably, it is at most 7%.

In a case where $TiO_2$ is contained, its content is preferably at most 6%. If it exceeds 6%, the transparency of the electrode-covering glass layer is likely to deteriorate.

$Al_2O_3$ is not essential, but may be contained up to 15% to stabilize the glass. If it exceeds 15%, devitrification is likely to result. Preferably, it is at most 8%. In a case where $Al_2O_3$ is contained, its content is preferably at least 1%, more preferably at least 3%.

BaO is not essential, but may be contained up to 25% in order to improve the water resistance, to suppress phase separation or to increase α. If it exceeds 25%, α tends to be too large. Preferably, it is at most 20%. In a case where BaO is contained, its content is preferably at most 1%, more preferably at least 10%.

Each of CuO and $CeO_2$ is not essential, but each may be contained up to 1% in order to suppress the yellow color by colloidal silver. If either one exceeds 1%, coloration of the electrode-covering glass layer itself will be distinct. In a case where at least one of CuO and $CeO_2$ is contained, the total content is preferably at least 0.2%.

In a case where CuO is contained, the content of $TiO_2$ is from 0 to 4.5%, i.e. $TiO_2$ may not be contained, but in a case where $TiO_2$ is contained, its content is preferably at most 4.5%. If it exceeds 4.5%, the transparency of the electrode-covering glass layer is likely to deteriorate.

The glass of the present invention consists essentially of the above components, but may contain other components within a range not to impair the purpose of the present invention.

The total of the contents of such other components is preferably at most 10%, more preferably at most 5%.

The following may, for example, be mentioned as such other components. Namely, as components to adjust $T_s$ or α, to stabilizer the glass, to improve the chemical durability, to adjust the color, etc., SrO, ZnO, $Li_2O$, $Na_2O$, $K_2O$, CoO, NiO and $Cr_2O_3$ may, for example, be mentioned. Further, in order to lower $T_s$, a halogen component such as F may be contained within a range not to lower the insulating property.

CoO has an effect to suppress the yellow color by colloidal silver and in some cases, it may preferably be contained within a range of up to 1%. If it exceeds 1%, coloration of the electrode-covering glass layer itself tends to be distinct, and its transparency will deteriorate, so that such will not be useful for covering transparent electrodes on a front substrate of a PDP. Preferably, it is at most 0.5%.

The application of the glass of the present invention is not limited to covering of transparent electrodes formed on a front substrate of PDP. For example, it can be used for covering of non-transparent electrodes formed on the rear substrate of PDP. In such a case, it may be mixed with e.g. a filler (including a pigment) in order to e.g. impart light reflectivity or light-shielding property, or a pigment may be mixed for coloration.

The filler to impart light reflectivity may, for example, be a white inorganic pigment containing at least one oxide selected from the group consisting of $TiO_2$, $Al_2O_3$ and $ZrO_2$.

The filler to impart a light shielding property may, for example, be a black inorganic pigment containing at least one oxide selected from the group consisting of $Cr_2O_3$, CuO, $MnO_2$, CoO, $Fe_2O_3$ and NiO, or a composite oxide composed of at least two oxides selected from such a group.

In a case where the glass of the present invention is employed for covering non-transparent electrodes formed on the rear substrate of PDP, it is preferred to employ one having the filler added in a proportion of from 0.1 to 40 parts by mass per 100 parts by mass of the glass of the present invention.

In a case where the glass of the present invention is used for covering transparent electrodes formed on a front substrate of PDP, a powder of the glass of the present invention may, for example, be formed into a paste, which is then coated and fired to cover the transparent electrodes. However, in a case where the electrode-covering layer is to be colored, a colored powder for covering electrodes comprising a powder of the glass of the present invention and a pigment (a colored powder of the present invention) may, for example, be formed into a paste, which is then coated and fired.

The colored powder of the present invention contains a pigment typically in a proportion of at least 0.05 part by weight per 100 parts by weight of the powder of the glass of the present invention. In a case where the transparent electrodes formed on the front substrate of PDP are to be covered, it is preferred that the pigment is contained in a proportion of at most 1 part by weight.

The pigment is preferably one containing at least one element selected from the group consisting of Ti, Al, Zr, Cr, Co and Mn. In a case where it is desired to have the coating layer colored blue, the pigment is preferably a blue color pigment containing Co, Al, etc. In a case where it is desired to have it colored yellow, the pigment is preferably a yellow color pigment containing Ti, Sb, Ni, etc.

In the front substrate of PDP of the present invention, transparent electrodes are formed on a glass substrate, and the surface of the glass substrate having the transparent electrodes formed thereon, is covered by the glass of the present invention.

The thickness of the glass substrate to be used for a front substrate is usually 2.8 mm, and the transmittance to a light having a wavelength of 550 nm (hereinafter referred to as $T_{550}$) of this glass substrate itself, is typically 90%. Further, its turbidity is typically 0.4%.

Further, the transparent electrodes are, for example, strips with a width of 0.5 mm, and the respective strip electrodes are formed to be in parallel with one another. The distance between the center lines of the respective strip electrodes is, for example, from 0.83 to 1.0 mm. In such a case, the proportion of the transparent electrodes occupying the surface of the glass substrate is from 50 to 60%.

With the front substrate of PDP of the present invention, $T_{550}$ is preferably at least 70%. If it is less than 70%, the image quality of PDP may deteriorate. More preferably, it is at least 74%.

Further, its turbidity is preferably at most 30%. If it exceeds 30%, the image quality of PDP may deteriorate. More preferably, it is at most 27%.

PDP of the present invention can be produced as follows, for example, when it is of an alternating current system.

Namely, patterned transparent electrodes and bus bars (typically silver lines) are formed on the surface of a glass substrate. Then, a powder of the glass of the present invention is coated and fired to form a glass layer. Finally, a magnesium oxide layer is formed as a protecting layer, to obtain a front substrate. On the other hand, on another glass substrate, patterned electrodes for address are formed. Then, barrier ribs are formed in a stripe shape, and phosphor layers are further printed and fired, to obtain a rear substrate.

Then, along the periphery of the front substrate and the rear substrate, a sealing material is coated by a dispenser, and the front and rear substrates are assembled so that the transparent electrodes face the electrodes for address, followed by firing to obtain PDP. Then, the interior of PDP is evacuated, and a discharge gas such as Ne or He—Xe is introduced in discharge space (cell).

The above example is of an alternating current system. However, the present invention is applicable also to PDP of a direct current system.

Now, the present invention will be described in further detail with reference to Examples. However, it should be understood that the present invention is by no means restricted to such specific Examples.

EXAMPLES

Starting materials were mixed so that the composition would be as shown by mass percentage in lines for PbO to MgO or CoO in Table 1 or 2. Then, this mixture was melted for 1 hour by means of a platinum crucible in an electric furnace of from 1,200 to 1,350° C. and formed into a thin sheet glass. Then this sheet glass was pulverized by a ball mill to obtain a glass powder. Examples 1 to 12 represent Examples of the present invention.

With respect to glass powders of Examples 1 to 12, $T_s$ (unit: ° C.), α (unit: $10^{-7}/°$ C.), ∈, $T_{550}$' (unit: %) and the turbidity (unit: %) were measured as follows.

$T_s$: measured by means of a differential thermal analyzer.

α: a glass powder was molded and then fired by maintaining it for 10 minutes at a firing temperature shown in line for $T_B$ (unit: ° C.) in each Table to obtain a fired product, which was processed into a cylindrical shape having a diameter of 5 mm and a length of 2 cm, whereupon the average linear expansion coefficient within a range of from 50 to 350° C. was measured by a thermal expansion meter.

∈: a glass powder was re-melted, molded into a plate shape and then processed into 50 mm×50 mm×3 mm, whereupon aluminum electrodes were formed on both sides by a vapor deposition method to obtain a sample. The relative dielectric constant at 1 MHz at 20° C. of this sample was measured by a LCR meter.

Further, in each of Examples 1 to 11, 100 g of the glass powder, or in Example 12, 100.3 g of a colored powder obtained by mixing 3 g of a blue color inorganic pigment Daipyroxide TM blue, manufactured by Dainichiseika Color & Chemicals Mfg.Co.,Ltd. containing Co and Al and 100 g of the glass powder, was kneaded with 25 g of an organic vehicle, to prepare a glass paste. Here, the organic vehicle was prepared by dissolving 12% by mass percentage of ethyl cellulose in α-terpineol.

Then, a glass substrate having a size of 50 mm×75 mm and a thickness of 2.8 mm was prepared. At a portion of 48 mm×73 mm on the surface of this glass substrate, a silver paste for screen printing was printed and fired to form line-shaped silver electrodes (width: 70 μm, space: 300 μm). The above glass substrate was made of glass having a composition, as represented by mass percentage, of $SiO_2$: 58%, $Al_2O_3$: 7%, $Na_2O$: 4%, $K_2O$: 6.5%, MgO: 2%, CaO: 5%, SrO: 7%, BaO: 7.5% and $ZrO_2$: 3% and having a glass transition point of 626° C. and an expansion coefficient of $83×10^{-7}/°$ C.

A glass substrate having silver electrodes thus formed, and a glass substrate having no electrode formed, were prepared, and the above-mentioned glass paste was uniformly screen printed at a portion of 50 mm×50 mm of each substrate, followed by drying at 120° C. for 10 minutes. Such glass substrates were heated at a temperature-rising speed of 10° C./min to the temperature of $T_B$ as identified in each Table and further maintained at that temperature for 30 minutes for firing. The thickness of the glass layer thus obtained was from 30 to 32 μm. With respect to a sample having the glass layer formed on the glass substrate having no silver electrode formed, $T_{550}$' (unit: %) and the turbidity (unit: %) were measured as follows.

$T_{550}$': the transmittance of light having a wavelength of 550 nm was measured by means of a self-recording spectrophotometer U-3500 (integrating-sphere type), manufactured by Hitachi, Ltd. The transmittance without a sample was rated 100%. $T_{550}$' is preferably at least 72%. If it is less than 72%, it tends to be difficult to obtain a front substrate of PDP having a $T_{550}$ of at least 70%.

Turbidity: measured by means of a haze meter (illuminant C employing a halogen bulb), manufactured by Suga Test Instruments Co., Ltd. The light from the halogen bulb was permitted to enter into the sample as parallel light rays by a lens, whereby the total light transmittance $T_t$ and the diffuse transmittance $T_d$ were measured by the integrating-sphere photometer, and the turbidity was calculated by the following formula.

Turbidity (%)=$(T_d/T_t)×100$

TABLE 1

| | Examples | | | | | | | |
|---|---|---|---|---|---|---|---|---|
| | 1 | 2 | 3 | 4 | 5 | 6 | 7 | 8 |
| PbO | 47 | 40 | 46 | 44 | 43.5 | 46.5 | 41 | 46 |
| $B_2O_3$ | 23 | 22 | 23.7 | 24.5 | 24 | 18.3 | 22.5 | 23.2 |
| $SiO_2$ | 4.5 | 7.7 | 5 | 5 | 5 | 10 | 7.7 | 5 |
| $Al_2O_3$ | 6 | 6 | 6 | 6 | 3.5 | 4 | 6 | 7.5 |
| $TiO_2$ | 2.7 | 0 | 2 | 2 | 2 | 2.5 | 0 | 2 |
| $ZrO_2$ | 0 | 0 | 0 | 0 | 0.5 | 0 | 5 | 0 |
| $La_2O_3$ | 0 | 0 | 0 | 0 | 3 | 0 | 0 | 0 |
| $Ta_2O_5$ | 0 | 7 | 0 | 0 | 0 | 0 | 0 | 0 |
| BaO | 16.5 | 17 | 17 | 18.2 | 18 | 18 | 17.5 | 16 |
| CuO | 0.3 | 0 | 0.3 | 0.3 | 0.5 | 0.7 | 0.3 | 0.3 |
| $CeO_2$ | 0 | 0.3 | 0 | 0 | 0 | 0 | 0 | 0 |
| MgO | 0 | 0 | 0 | 0 | 0 | 0 | 0 | 0 |
| $T_S$ | 560 | 590 | 555 | 590 | 540 | 560 | 590 | 570 |
| α | 83 | 74 | 82 | 77 | 86 | 85 | 76 | 82 |
| ε | 11.7 | 11.2 | 11.6 | 11.0 | 12.8 | 12.1 | 11.0 | 11.2 |
| $T_B$ | 550 | 580 | 550 | 590 | 550 | 550 | 580 | 570 |
| $T_{550}'$ | 79 | 79 | 79.5 | 80 | 75 | 74 | 81 | 80 |
| Turbidity | 20 | 14 | 12 | 12 | 22 | 21 | 12 | 14 |

TABLE 2

| | Examples | | | |
|---|---|---|---|---|
| | 9 | 10 | 11 | 12 |
| PbO | 45.3 | 44.1 | 46 | 46 |
| $B_2O_3$ | 21.9 | 22.2 | 23.6 | 23.7 |
| $SiO_2$ | 7.7 | 7.7 | 5 | 5 |
| $Al_2O_3$ | 6.1 | 6.1 | 5.9 | 6 |
| $TiO_2$ | 3.4 | 4.1 | 1.9 | 2 |
| $ZrO_2$ | 0 | 0 | 0 | 0 |
| $La_2O_3$ | 0 | 0 | 0 | 0 |
| $Ta_2O_5$ | 0 | 0 | 0 | 0 |
| BaO | 15.6 | 15.8 | 17.1 | 17 |
| CuO | 0 | 0 | 0.3 | 0.3 |
| $CeO_2$ | 0 | 0 | 0 | 0 |
| MgO | 0 | 0 | 0.2 | 0 |
| Pigment | 0 | 0 | 0 | 0.3 |
| $T_S$ | 570 | 580 | 555 | 590 |
| α | 79 | 77 | 82 | 82 |
| ε | 11.7 | 11.5 | 11.6 | 11.7 |
| $T_B$ | 560 | 560 | 550 | 590 |
| $T_{550}'$ | 80 | 80 | 79.5 | 77 |
| Turbidity | 14 | 12 | 14 | 18 |

According to the present invention, the dielectric constant of the electrode-covering glass layer can be made to be within a proper range, for example, from 10.8 to 13. Further, PDP having such an electrode-covering glass layer can be obtained.

The entire disclosure of Japanese Patent Application No. 2002-230995 filed on Aug. 8, 2002 including specification, claims and summary is incorporated herein by reference in its entirety.

What is claimed is:

1. A glass for covering electrodes, which consists essentially of, as represented by mass percentage based on the following oxides, from 35 to 55% of PbO, from 15 to 30% of $B_2O_3$, from 4 to 15% of $SiO_2$, from 20 to 44% of $B_2O_3+SiO_2$, from 0.5 to 10% of $TiO_2+ZrO_2+La_2O_3+Ta_2O_5$, from 1 to 10% of $Al_2O_3$, from 12–20% of BaO, from 0 to 1% of CuO and from 0 to 1% of $CeO_2$.

2. The glass for covering electrodes according to claim 1, wherein CuO is contained, and the content of $TiO_2$ is from 0 to 4.5%.

3. The glass for covering electrodes according to claim 1, which has a softening point of from 520 to 650° C.

4. A colored powder for covering electrodes, which comprises a powder of the glass for covering electrodes as claimed in claim 1 and a pigment.

5. A process for producing a plasma display device, wherein covering of transparent electrodes formed on a glass substrate constituting a front substrate, is carried out by coating and firing a powder comprising a glass for covering electrodes.

wherein the glass consists essentially of, as represented by mass percentage based on the following oxides, from 35 to 55% of PbO, from 15 to 30% of $B_2O_3$, from 4 to 15% of $SiO_2$, from 20 to 44% of $B_2O_3+SiO_2$, from 0.5 to 10% of $TiO_2+ZrO_2+La_2O+Ta_2O_5$, from 0 to 15% of $Al_2O_3$, from 0 to 25% of BaO, from 0 to 1% of CuO and from 0 to 1% of $CeO_2$, to cover the electrodes.

6. The process for producing a plasma display device, as claimed in claim 5, wherein the powder further comprises a pigment.

7. A plasma display device comprising a glass substrate constituting a front substrate and transparent electrodes formed on the glass substrate, wherein the transparent electrodes are covered by a glass for covering electrodes, and wherein the glass consists essentially of, as represented by mass percentage based on the following oxides from 35 to 55% of PbO, from 15 to 30% of $B_2O_3$, from 4 to 15% of $SiO_2$, from 20 to 44% of $B_2O_3+SiO_2$, from 0.5 to 10% of $TiO_2+ZrO_2+La_2O_3+Ta_2O_5$, from 0 to 15% of $Al_2O_3$, from 0 to 25% of BaO, from 0 to 1% of CuO and from 0 to 1% of $CeO_2$.

8. A plasma display device comprising a glass substrate comprising a front substrate and transparent electrodes formed on the glass substrate, wherein at least one transparent electrode is covered by a colored glass comprising a pigment and a glass, wherein the glass consists essentially of, as represented by mass percentage based on the following oxides, from 35 to 55% of PbO, from 15 to 30% of $B_2O_3$, from 4 to 15% of $SiO_2$, from 20 to 44% of $B_2O_3+SiO_2$, from 0.5 to 10% of $TiO_2+ZrO_2+La_2O_3+Ta_2O_5$, from 0 to 15% of $Al_2O_3$, from 0 to 25% of BaO, from 0 to 1% of CuO and from 0 to 1% of $CeO_2$, to cover the electrodes.

9. The glass for eovering electrodes according to claim 1, wherein the content of PbO is at least 40% and at most 50%.

10. The glass for covering electrodes according to claim 1, wherein the content of $B_2O_3$ is at least 18% and at most 28%.

11. The glass for covering electrodes according to claim 1, wherein the content of $SiO_2$ is at least 4.5% and at most 12%.

12. The glass for covering electrodes according to claim 1, wherein the $B_2O_3+SiO_2$ content ranges from 25 to 40%.

13. The glass for covering electrodes according to claim 1, wherein the $TiO_2+ZrO_2+La_2O_3+Ta_2O_5$ content ranges from 1 to 7%.

14. The glass for covering electrodes according to claim 1, wherein $Al_2O_3$ is present in the glass in an amount that is at least 1% and at most 8%.

15. The glass for covering electrodes according to claim 1, wherein BaO is present in the glass in an amount that is at least 16% and at most 18.2%.

16. The glass for covering electrodes according to claim 1, wherein the glass has a softening point of from 450 to 650° C.

17. The glass for covering electrodes according to claim 1, wherein the glass has a softening point of from 550 to 620° C.

18. The glass for covering electrodes according to claim 1, wherein the glass has a relative dielectric constant $\in$ at 1 MHz of from 10.8 to 13.

19. The glass for covering electrodes according to claim 1, wherein the glass has a transmittance of light at 550 nm of at least 72%.

20. The plasma display device according to claim 7, wherein the content of $Al_2O_3$ is from 1 to 10%, and the content of BaO is from 12 to 20%.

21. The plasma display device according to claim 7, wherein the content of PbO is at least 40% and at most 50%.

22. The plasma display device according to claim 7, wherein the content of $B_2O_3$ is at least 18% and at most 28%.

23. The plasma display device according to claim 7, wherein the content of $SiO_2$ is at least 4.5% and at most 12%.

24. The plasma display device according to claim 8, wherein the $B_2O_3+SiO_2$ content ranges from 25 to 40%.

25. The plasma display device according to claim 7, wherein the $TiO_2+ZrO_2+La_2O_3+Ta_2O_5$ content ranges from 1 to 7%.

26. The plasma display device according to claim 7, wherein $Al_2O_3$ is present in the glass in an amount that is at least 1% and at most 8%.

27. The plasma display device according to claim 7, wherein BaO is present in the glass in an amount that is at least 1% and at most 20%.

28. The plasma display device according to claim 8, wherein the content of $Al_2O_3$ is from 1 to 10%, and the content of BaO is from 12 to 20%.

29. The plasma display device according to claim 8, wherein the content of PbO is at least 40% and at most 50%.

30. The plasma display device according to claim 8, wherein the content of $B_2O_3$ is at least 18% and at most 28%.

31. The plasma display device according to claim 8, wherein the content of $SiO_2$ is at least 4.5% and at most 12%.

32. The plasma display device according to claim 8, wherein the $B_2O_3+SiO_2$ content ranges from 25 to 40%.

33. The plasma display device according to claim 8, wherein the $TiO_2+ZrO_2+La_2O_3+Ta_2O_5$ content ranges from 1 to 7%.

34. The plasma display device according to claim 8, wherein $Al_2O_3$ is present in the glass in an amount that is at least 1% and at most 8%.

35. The plasma display device according to claim 8, wherein BaO is present in the glass in an amount that is at least 1% and at most 20%.

* * * * *